US008892551B2

(12) United States Patent
Oikonomou (10) Patent No.: US 8,892,551 B2
(45) Date of Patent: Nov. 18, 2014

(54) METHOD AND SYSTEM OF LOCATION-BASED CONTENT ORGANIZATION AND CONTENT SUGGESTIONS

(75) Inventor: Georgios Oikonomou, Rio (GR)

(73) Assignee: Citrix Systems, Inc., Fort Lauderdale, FL (US)

( * ) Notice: Subject to any disclaimer, the term of this patent is extended or adjusted under 35 U.S.C. 154(b) by 167 days.

(21) Appl. No.: 13/536,350

(22) Filed: Jun. 28, 2012

(65) Prior Publication Data

US 2014/0006414 A1 Jan. 2, 2014

(51) Int. Cl.
 *G06F 17/30* (2006.01)
(52) U.S. Cl.
 USPC ........... 707/728; 707/737; 707/748; 707/749; 707/751

(58) Field of Classification Search
 CPC ................ G06F 17/30598; G06F 17/30766
 See application file for complete search history.

(56) References Cited

U.S. PATENT DOCUMENTS

| 2011/0105143 A1* | 5/2011 | Harple et al. ............ 455/456.1 |
| 2011/0213801 A1* | 9/2011 | He ............................. 707/770 |

* cited by examiner

*Primary Examiner* — Ahn Tai Tran
(74) *Attorney, Agent, or Firm* — Finnegan, Henderson, Farabow, Garrett & Dunner, LLP (57) ABSTRACT

A method of location-based data organization is provided. The method includes obtaining a graph that includes nodes, each node connected to at least one other node with an arc. The nodes include a geography nodes associated with geographical locations, and activity nodes. The method also includes dynamically assigning weights to the nodes, and finding, for a first activity node, a suggested set of one or more activity nodes.

19 Claims, 5 Drawing Sheets

METHOD AND SYSTEM OF LOCATION-BASED CONTENT ORGANIZATION AND CONTENT SUGGESTIONS

BACKGROUND INFORMATION

Online social networking has become an increasingly popular platform for building and maintaining one's social and professional relations. People use social networks to communicate with their real-life connections and with other people who share their interests, activities, and backgrounds. Communicating in a social network can be achieved, for example, through personal messages between users, through creating posts or commenting on other users' posts, through group discussions, and so forth.

Due to the overwhelming number of members and the vast amounts of available information, it may be difficult for a user to find other users with similar interests and backgrounds, a group dedicated to an interesting topic, event or activity, or other types of relevant information.

To address that need, social network operators establish suggestion engines that try to predict what information the user may be interested in, and provide that information to the user. The more accurate the suggestion engine is, the more users will be following its recommendations, making meaningful connections, and finding meaningful information, thereby increasing their overall satisfaction with the service.

Many factors can be taken into consideration when deciding which users and what information may be of interest to a particular user. An increasingly important factor, however, is the user's geographical location. Users living in the same geographical area (country, region, city, neighborhood) will often have more common interests, such as the local news, local events, local businesses, etc.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts. Exemplary embodiments disclosed herein are directed to methods and systems for location-based content organization and content suggestions.

Figure 1:
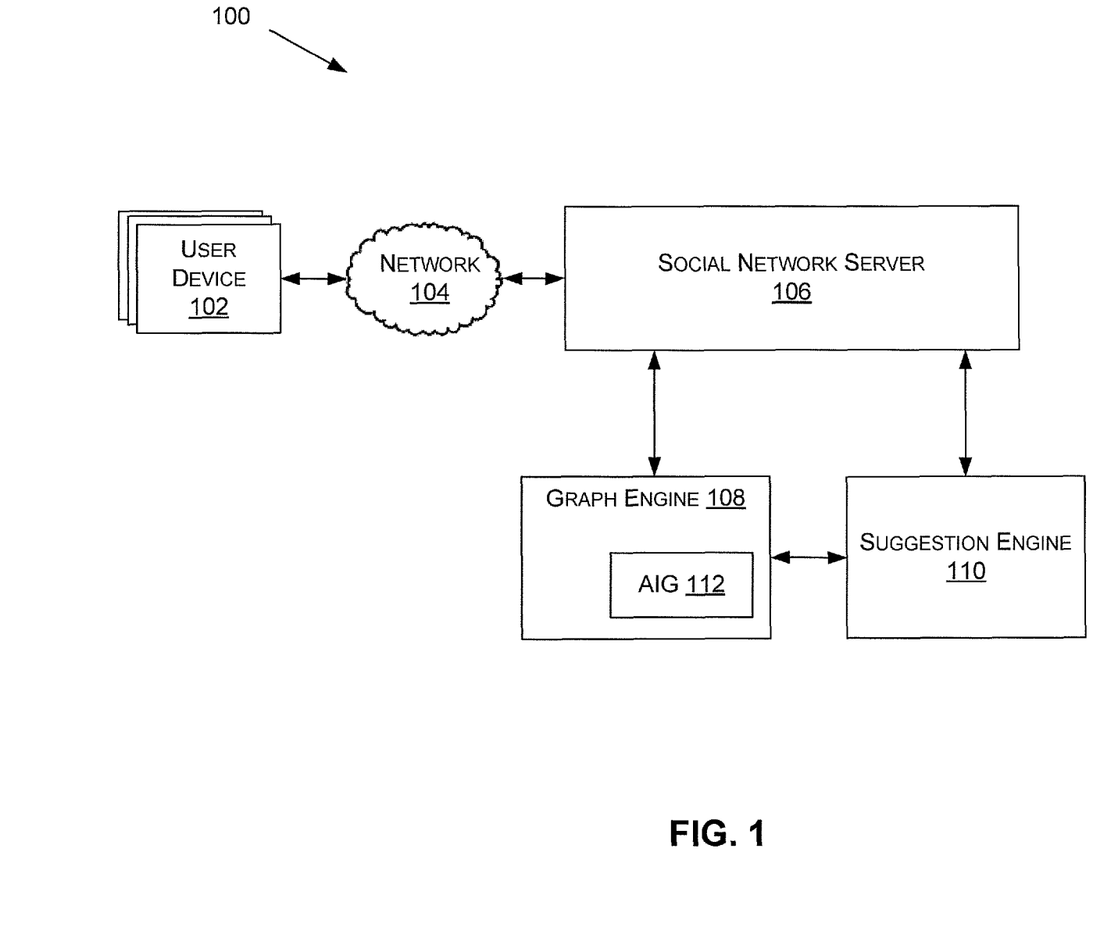
FIG. 1 illustrates a block diagram of an exemplary system.

FIG. 1 is a block diagram of an exemplary system. The exemplary system can include, among other things, one or more user devices 102, a network 104, a social network server 106, a graph engine 108, and a suggestion engine 110.

User device 102 can be a computer program or a hardware device with networking capabilities. For example, user device 102 can be a desktop, a laptop, a netbook or a tablet computer, a smart phone, a feature phone, etc. In some embodiments, user device 102 can implement the client side of a social network application, for example, a mobile "app." User device 102 can receive inputs from the user (e.g., through the social network application client) and provide input data corresponding to the inputs to social network server 106, for example, via network 104. User device 102 can also receive output data from social network server and provide it to the user. User device 102 can also determine, and provide to social network server 106, its geographical location. The geographical location can be retrieved, for example, from a GPS module that can be incorporated into user device 102. Alternatively, the geographical location can be obtained through techniques such as triangulation, or it can be manually specified by the user.

Network 104 can be any type of network, including, but not limited to, any combination of wide area networks (WANs), local area networks (LANs), or wireless networks suitable for networking communication such as Internet communication.

Social network server 106 is one or more network devices that can implement the server side of the social network application. Social network server 106 can receive input data from user devices 102, process the input data, and provide output data to user devices 102. Social network server 106 can have one or more processors and at least one memory for storing program instructions. The processor(s) can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the methods can be implemented in hardware components or combinations of hardware and software such as, for example, ASICs, special purpose computers, or general purpose computers.

Graph engine 108 is a computer program or a hardware device that can receive input graph data from social network server 106, process the input graph data, and update an activity information graph ("AIG") 112 based on the processed input graph data. Graph engine 108 can also retrieve data from AIG 112, process the retrieved data, and provide output graph data to social network server 106 based on the processed retrieved data. Graph engine 108 can also initialize AIG 112, for example, before receiving any input graph data from social network server 106. Graph engine 108 can be a part of social network server 106 or it can be located outside social network server 106, for example, on a remote server that can communicate with social network server 106.

AIG 112 is a data structure that stores graph data. The graph data can be stored, for example, on any combination of volatile and non-volatile memories, such as a hard drive, a solid state memory, a random-access memory (RAM), and so forth. AIG 112 can be contained, for example, within graph engine 108, within social network server 106, or in a remote location communicatively coupled to any of the above.

Suggestion engine 110 can be a computer program or a hardware device that can receive the graph data stored in AIG 112, for example, from graph engine, process the graph data, and provide suggestion data to social network server 106. Suggestion engine 110 can be a part of social network server 106 or can be located outside social network server 106, for example, on a remote server that can communicate with social network server 106.

Figure 2:
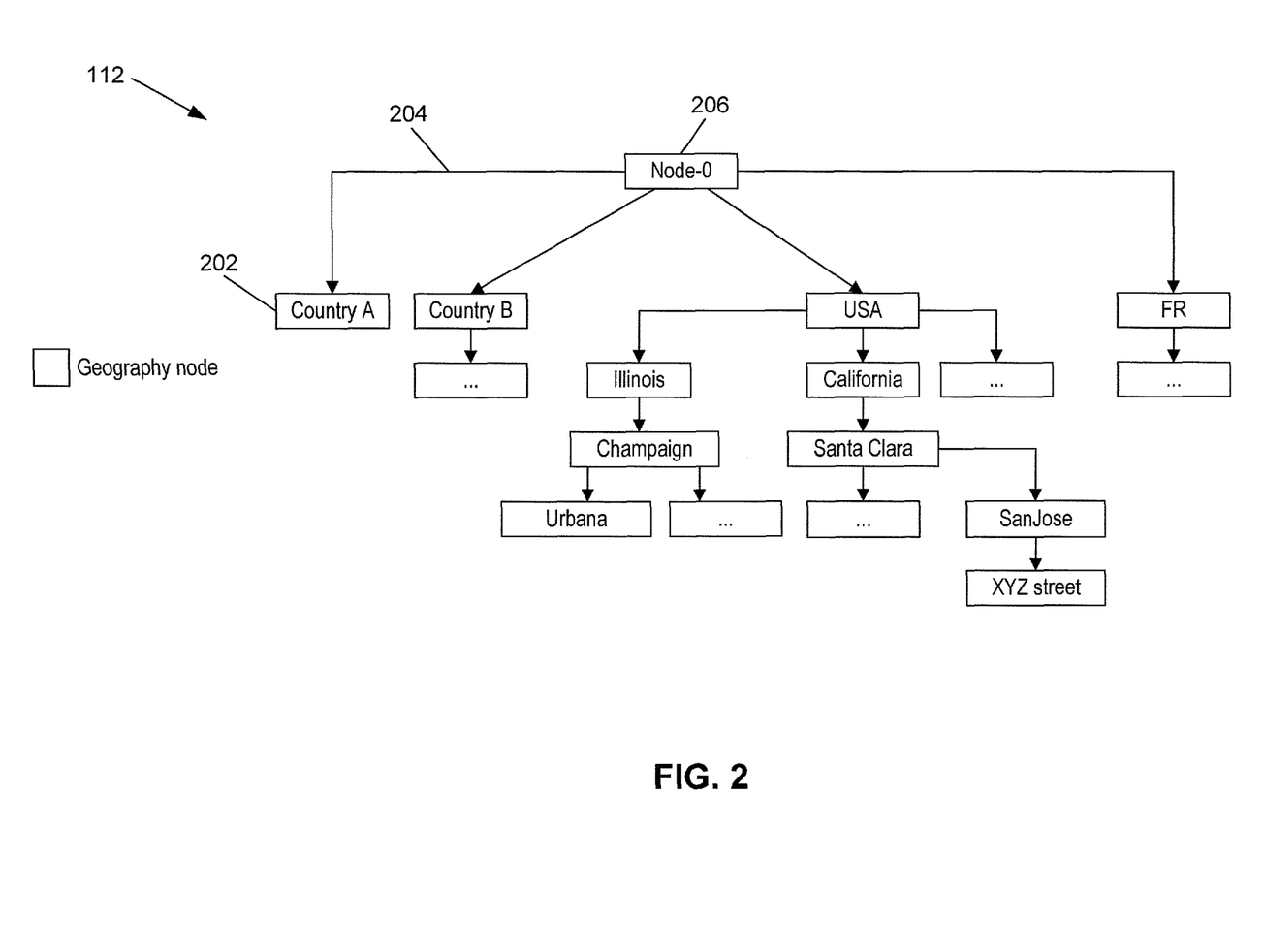
FIG. 2 is an activity information graph containing geographical information, in accordance with an embodiment.

FIG. 2 illustrates an exemplary embodiment of AIG 112 that includes geographical information. As will be described below, including the geographical information in the same graph with information related to user activities has many advantages, including providing the users with location-based (location-aware) content suggestions. AIG 112 can be a directed or a non-directed graph that includes, among other things, geography nodes 202 (indicated by rectangles). The nodes can be interconnected with directed arcs 204, each directed arc 204 having a tail connected to the "parent" node, and a head connected to the "child" node. Geography nodes 202 can be interconnected in a way that reflects location-based relations among countries, counties, cities, neighborhoods, buildings, apartments, or any other location-related entities. In some embodiments, geography node 202 corresponding to a larger region can be a parent node of ("point to") a geography node 202 corresponding to a smaller region. Thus, geography node 202 "USA" can point to "California", which points to the county "Santa Clara", which points to the city "San Jose", which points to a hypothetical street name "XYZ". Geography nodes 202 that correspond to geographical locations that are not part of any other geographical location (for example, country names), can have root node 206 ("Node-0") as their parent. Root node 206 thus guarantees that AIG 112 is a connected graph, meaning that there is at least one path between any two geography nodes 202 in AIG 112. The finest-granularity geography nodes 202, i.e., geography nodes 202 that have no child geography nodes 202, are referred to as "leaf geography nodes".

Building AIG

In some embodiments, geography nodes 202 can be created dynamically after graph engine 108 receives input graph data from social network server. For example, after user logs into the social network application from user device 102, user device 102 can provide its geographical location to social network server 106 that can then provide the geographical location to graph engine 108. Graph engine 108 can then run a reverse geocode query using a public or subscription-based geocode service, and obtain geographical information (e.g., country, state, city, etc.) corresponding to that geographical location. After obtaining the geographical information, graph engine 108 determines whether AIG 112 already contains all nodes associated with the geographical information, and if not, such nodes are added.

Figure 3:
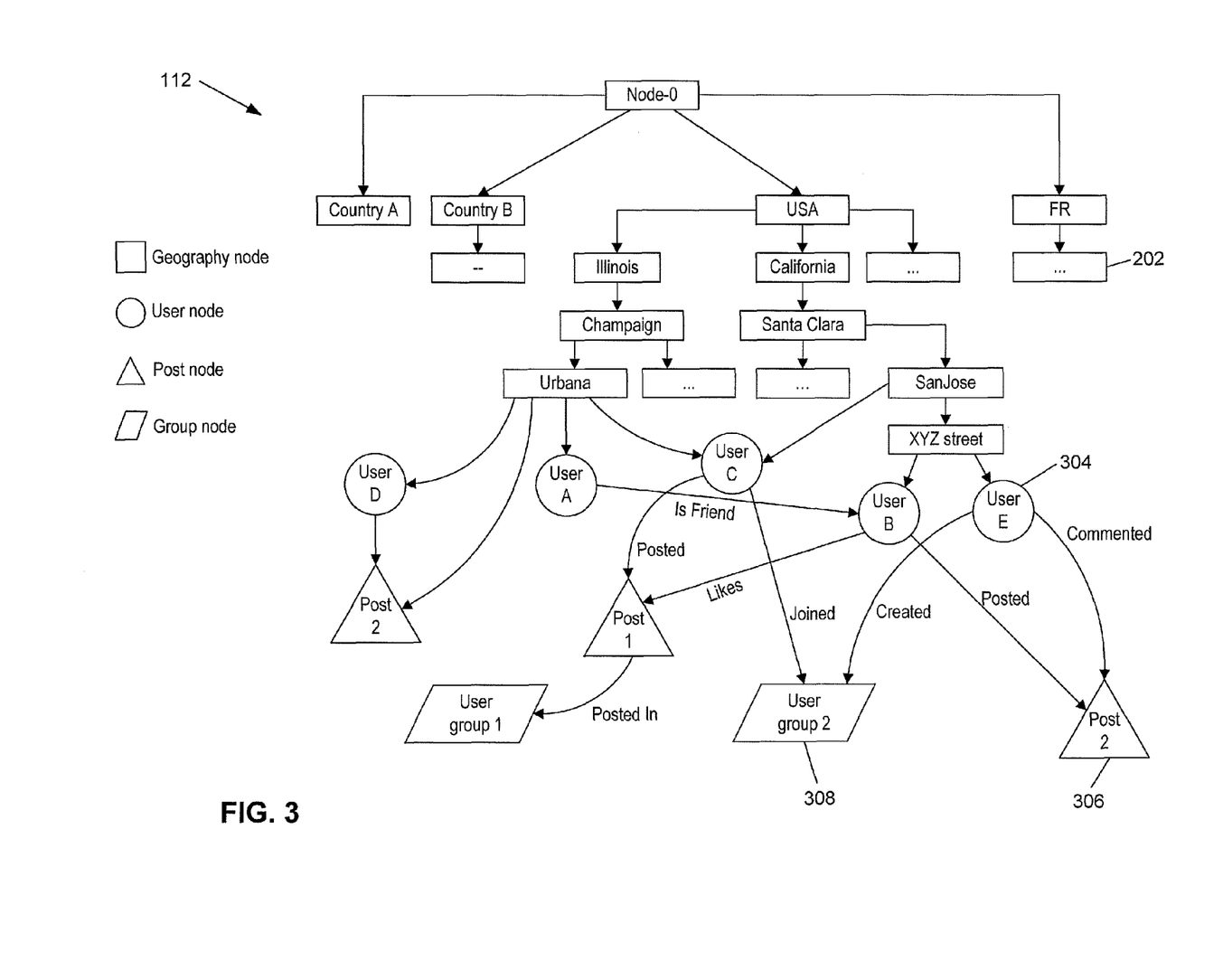
FIG. 3 is an activity information graph containing geographical information and activity information, in accordance with an embodiment.

FIG. 3 illustrates an exemplary embodiment of AIG 112 that, in addition to geography nodes 202, includes activity nodes. Activity nodes can include, for example, user nodes 304 (indicated by a circle), post nodes 306 (indicated by a triangle), group nodes 308 (indicated by a parallelogram), and any other entities or activities that may be included in a social network application. Activity nodes can be created by graph engine 108 as a result of users' actions. For example, when a new user signs up for the social network application, graph engine 108 can create a new user node 304 corresponding to the new user. When the user creates a new post, graph engine 108 can create a new post node 306. When the user creates a group, graph engine 108 can create a new group node 308.

In some embodiments, nodes can connect to other nodes with directed arcs 204, and directed arcs 204 can have tags identifying the nature of the corresponding actions by the users. For example, when "User E" creates a new group "User group 2", graph engine 108 can create a new user node 308 for "User group 2" and a directed arc 204 that points from "User E" to "User group 2" and has a tag CREATED. When "User C" later joins group "User group 2", graph engine 108 can add a new directed arc 204, which points from "User C" to "User group 2" and is tagged as JOINED. Following is the description of some of the tags that can be associated with directed arcs 204.

Examples of directed arcs 204 leading from one user node 304 to another user node 304 can include: IS_FRIEND, VIEWED_PROFILE, COMMENTED_CONTENT, RATED, indicating, respectively, that the first user is a friend of, viewed the profile of, commented on the content of, or rated the second user. Examples of directed arcs 204 leading from user node 304 to post node 306 can include: POSTED, COMMENTED, LIKED, RATED, FORWARDED, indicating, respectively, that the user posted, commented, liked, rated, or forwarded the post. Examples of directed arcs 204 leading from user node 304 to group node 308 can include: CREATED, JOINED, LEFT, COMMENTED, POSTED, indicating, respectively, that the user created, joined, left, commented in, or posted in the group, respectively. Examples of directed arcs 204 leading from post node 306 to group node 308 can include: BELONGS_TO, FORWARDED_TO, indicating, respectively, that the post belongs to or was forwarded to the group, respectively.

In some embodiments, any type of activity node can be connected to any other (or the same) type of activity nodes. Moreover, one node can be connected to another node with more than one arc. For example, a user can create a post and then comment on it. As a result, graph engine 108 can add two directed arcs 204 from the user to the post: one tagged as POSTED and one tagged as COMMENTED.

In some embodiments, each activity node can be associated with one or more properties. Properties of user node 304 can include, for example, any personal information provided by the user on sign up. The properties can also include statistical information, such as the number of posts created by the user, the number of comments on those posts, how frequently the user changes location, how frequently the user logs into the social network application, etc. In some embodiments, the properties can include the type of the user's presence, such as "online", "offline", "away", "busy", etc.

Properties of post node 306 can include, for example, the type of the post (video, audio, photo, raw data, etc.), title, description, content, comments, rating, and so forth. The properties can also include any information retrieved from a metadata, such as the JPEG EXIF or the 3GP metadata. For example, for a post including a photo, post node 306 can have properties that indicate the time and the location where the photo was taken, based on the JPEG EXIF information extracted from the photo. For posts including video or images, the properties can also include any visual metadata obtained by image/video processing. Similarly, for posts including audio, the properties can include audio characteristics obtained by audio signal processing. The video/image/audio processing can be performed, for example, by social network server 106.

Properties of group node 308 can include, for example, the number of members in that group, the number and the type of posts in the group, the number of times the group has been viewed by non-members, and so forth.

In some embodiments, activity nodes are also connected to geography nodes 202, but only as children, and only to geography nodes 202 that don't have child geography nodes 202, i.e., only to leaf geography nodes. For example, activity node "User E" can be connected as a child to a leaf geography node "XYZ street" but not to "San Jose", because "San Jose" is not a leaf geography node.

In some embodiments, user node 304 is always connected to the leaf geography node that corresponds to the user's location. Graph engine 108 can determine the user's location any time when the user performs an action. For example, any time the user logs into the social network application, creates a new group or post, comments, adds a friend, or performs any other action, social network server 106 can receive from user device 102 the user's geographical location, and provide that location to graph engine 108. Graph engine 108 can then run a reverse geocode query, mentioned above, or use geocode data cached from previous queries, to determine the geography node 202 that corresponds to that geographical location. If user node 304 associated with the user is already connected to the determined geography node 202, graph engine 108 may do nothing. Otherwise, graph engine 108 can connect the user node 304 to the determined geography node 202. Thus, for example, when the user is using the social network application while traveling, graph engine 108 can keep dynamically reconnecting that user's user node 304 to geography node 202 that corresponds to the user's location at any given time. In some embodiments, when user node 304 is reconnected to another geography node 202, the rest of the connections (arcs) of the user node 304 remain unchanged, that is, the user maintains all his/her connections to other users, posts, groups or any other activity nodes.

In some embodiments, a post node 306 can be connected to the leaf geography node that corresponds to the post's location. In some embodiment, the post's location is set only once, when the post is created, and is determined, for example, based on the location, at the moment, of the user who created the post. In some embodiments, a post's location does not change, even if, for example, the user who created the post moves to another location.

In some embodiments, a group node 308 can be connected to the leaf geography node that corresponds to the group's location. In some embodiment, the group's location is only set once, when the group is created, and is determined, for example, based on the location, at the moment, of the user who created the group. In some embodiments, a group's location does not change, even if, for example, the user who created the group moves to another location.

Node and Arc Weights

In some embodiments, the nodes of AIG 112 can have weights. The weights can be dynamic and recalculated by graph engine 108, for example, each time any user performs any action, and/or periodically.

In some embodiments, user node 304 is weighed, for example, based on any combination of the following factors: the popularity of the user's posts, the number and/or the quality of the user's friends (other users connected with arc IS_FRIEND), the frequency of the user's logins, and any other suitable factors. For example, the following formula can be employed in calculating the weight ($W_u$) of a given user node 304:

$$W_u = \left( a \sum_{c \in UP(u)} Vot(c) + b \sum_{c \in UP(u)} Com(c) + l \cdot f(BL(u)) \right) m \cdot (Login(u))$$

where UP(u) are all posts created by the user, Vot(c) is a function returning the normalized ranking of post c, Com(c) a function returning the influence of a post c as determined, for example by its comments, BL(u) a normalized estimate of the social connections of the user, and Login(u) is the function returning the frequency of logins, for example, with regard to the total time the user was logged into the social network application and the total duration of the log-in sessions. Any combination of constants a, b, l, and m, and any function $f$ can be used in the formula.

In some embodiments, post node 306 is weighed, for example, based on any combination of the following factors: the number and the frequency of votes (e.g., "likes") it received, the number and the quality of the comments it received, the number and the frequency of times it was viewed, and so forth. For example, the following formula can be employed in calculating the weight ($W_p$) of a given post node 306:

$$W_p = (a \cdot Vot(p) + b \cdot Com(p) + c \cdot Views(p)) \cdot m \cdot (RD(p))$$

where Vot(p) is a function returning the normalized ranking of the post, Com(p) a function returning the influence of the post as determined, for example, by the number and the quality of its comments, Views(p) is a function denoting the number and the frequency of views for the post, and RD(p) is any type of aging function, e.g., a monotonic decreasing function. Any combination of constants a, b, c, and m can be used in the formula.

In some embodiments, group node 308 is weighed, for example, based on any combination of the following factors: the weights of its member users, the weights of the posts contained in the group, and the social ranking of the group (explained below). For example, the following formula can be employed in calculating the weight ($W_g$) of a given group node 304:

$$W_g = a \cdot \sum_{u \in U(g)} W_u + b \cdot \sum_{p \in P(g)} W_p + c \cdot Soc(g)$$

where U(g) is the set of the users that are members of the group, P(g) is the set of the posts in the group, $W_u$ is the weight of user g (calculated above), $W_p$ is the weight of post p (calculated above), and Soc(g) is a function that returns the social rank of the group (e.g., the number of joined user times a coefficient for the social relationships among them). Any combination of constants a, b, and c can be used in the formula.

In some embodiments, geography node 202 is weighed, for example, based on any combination of the following factors: the weights of the users, posts, and groups that are connected to the given geography node 202. For example, the following formula can be employed in calculating the weight ($W_l$) of a given geography node 202:

$$W_l = a \cdot \sum_{u \in U(l)} W_u + b \cdot \sum_{p \in P(l)} W_p + c \cdot \sum_{g \in G(l)} W_g + d \cdot Soc(l)$$

where U(l) is the set of the users connected to the given geography node 202, P(l) is the set of the posts connected to the given geography node 202, G(l) is the set of the groups connected to the given geography node 202, and Soc(l) is a function that returns the social rank of the given geography node 202 by recursively examining the connections among subscribers, posts and groups within current location group l. Any combination of constants a, b, c, and d can be used in the formula.

In some embodiments, when a new node is added to AIG 112, its first weight is calculated using a different formula, i.e., an initialization weighing formula. Newly created nodes can be too disadvantaged compared to older nodes if they are ranked using the same standard formula, because initially they lack the connection and the properties that contribute to the weight. Therefore, initialization weighing formula can provide the new node with a higher ranking than the standard formula. For example, the initialization ranking formula can use higher constants (a, b, c, etc.), set a certain minimum, or use a different set of factors. The initialization ranking formula can be applied once or several times to "new" nodes, where the node is considered "new" for a predefined period of time, for example. After the predefined period of time, AIG 112 can begin to apply the standard formula.

Because a node's weight can depend on the weights of the neighboring nodes (as described in the exemplary formula above), a change in one node's weight can trigger a change in another node's weight. Thus, recursively, a change in one node's weight can theoretically result in weight changes of all the nodes within AIG 112.

In some embodiments, when a weight of a given node changes, graph engine 108 can immediately ("on-line") update other nodes whose weights depend on the given node's weight. In some embodiments, AIG 112 can limit the number of nodes it updates on-line as a result of another node's weight update. For example, in some embodiments, graph engine 108 can only update the immediate neighbors of a given node, but not, for example neighbors' neighbors.

In some embodiments, graph engine 108 can periodically (e.g., once an hour, once a day, etc.) perform a full "off-line" update of all the nodes of the graph. Graph engine 108 can also employ techniques to avoid unwanted circular updates, where one node's update triggers a series of other nodes' updates, which can sometimes end up triggering an update of the first node.

Territorial Influence

In some embodiments, a territorial influence can be defined for each user, indicating the level of influence (popularity) the user has in a certain geographical area. First, activity surfaces (AS) can be defined for each activity event within AIG 112. Activity events include any activities or changes within AIG 112, such as creating a new post, rating or commenting on a post, creating a group, etc. Activity surface can be defined, for example, as a circular surface centered at a latitude and longitude of the activity event, as defined, for example, by the geographical node 202 corresponding to the activity event. The radius of the surface can be, for example, a normalized weight of the activity node corresponding to the activity event. Each activity surface is associated with one user, for example, the user who generated the activity event. Each activity surface can also be associated with a date, for example, the creation date of the corresponding activity event.

A given geographical area a can include more than one activity surface, corresponding to more than one user, and the activity surfaces can overlap with each other. In some embodiments, TS(u, a) is the territorial surface of a user u within a geographical area a, which can be computed, for example, by graph engine 108, as follows. First, graph engine 108 can collect a set of all activity surfaces that overlap with the geographical area a. Next, graph engine 108 can traverse the collected set in chronological order, that is, from older activity surfaces to newer activity surfaces. Next, graph engine 108 can construct the territorial surface for user u within the geographical area a by creating a spatial union of all activity surfaces of user s within a, excluding activity areas associated with other users. For example, for each activity surface E within the collected set:

$$TS_{new}(u, a) = \begin{cases} TS_{old}(u, a) \cup E, & \text{if user } (E) \equiv u \\ TS_{old}(u, a) \setminus (TS_{old}(u, a) \cap E), & \text{if user } (E) \not\equiv u \ \& \ \text{area } (E) \geq A_t \\ TS_{old}(u, a), & \text{if user } (E) \not\equiv u \ \& \ \text{area } (E) < A_t \end{cases}$$

where $A_t$ is an area threshold value used to eliminate activity surfaces with small areas from the calculation, thereby reducing computational complexity. Once the territorial surface of a given user in a given geographical location is determined, territorial influence of the user in that geographical location can be defined, for example, as the total area of the territorial surface.

In some embodiments, user's territorial influence can be reflected in AIG 112. In an example embodiment illustrated in FIG. 4, influence arcs 402 can be added between geography nodes 202 and user nodes 304, each arc indicating the level of territorial influence that the user has in the geographical area corresponding to the geography node 202.

Figure 4:
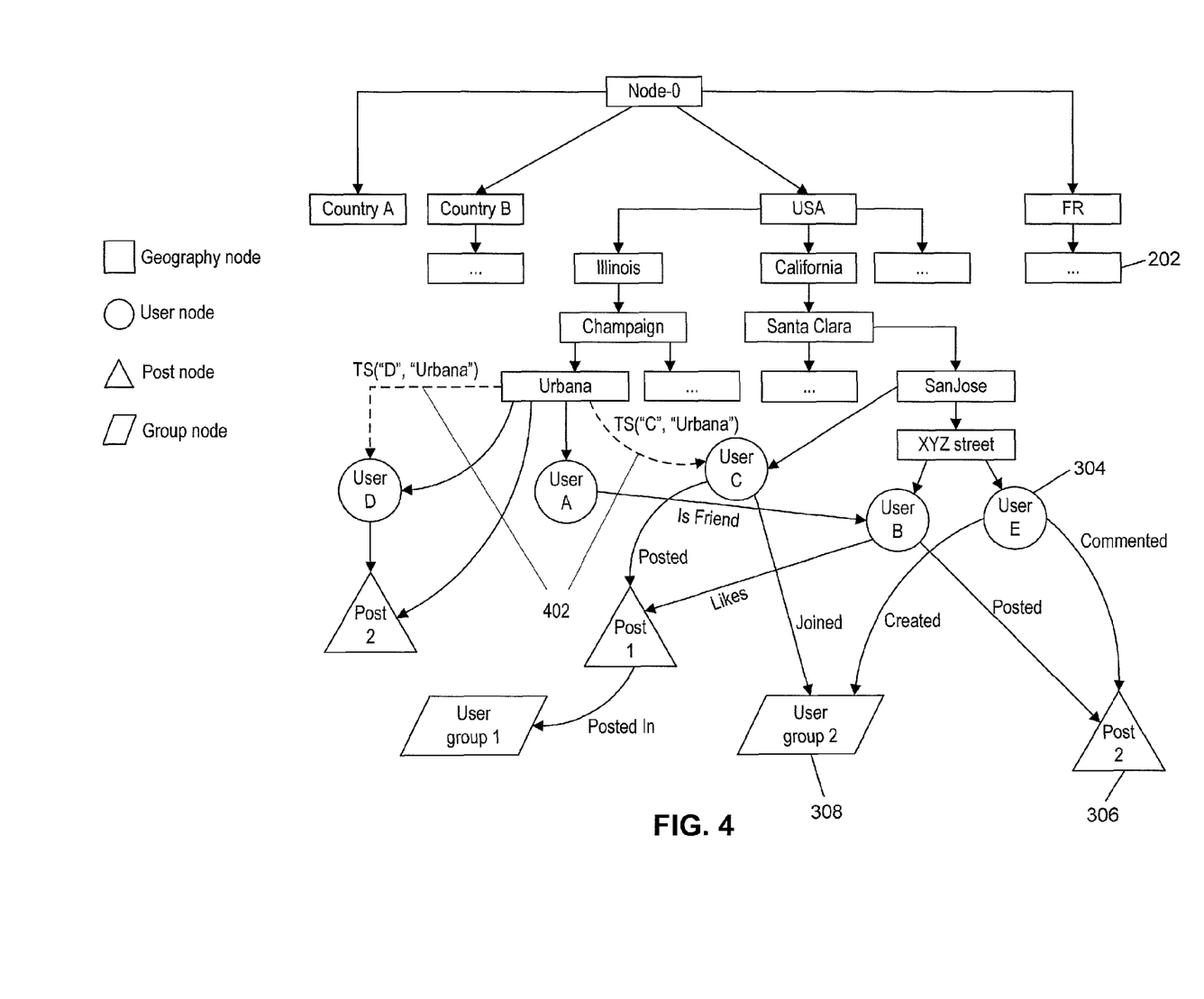
FIG. 4 is an activity information graph containing, among other things, territorial influence information.

In some embodiments, the arcs within AIG 112 can also have weights. For example, an influence arc 402 can be assigned a weight corresponding to the territorial influence that its user node 304 has in its geography node 202. In some embodiments, arcs can also have properties. For example, an arc leading from user node 304 to post node 306 and tagged as COMMENTED can have, as its properties, the text of the comment, the date on which the comment was created, etc.

Providing Suggestions

In some embodiments, AIG 112 can be used by suggestion engine 110 to make suggestions to users. Suggestions to users can be done either in response to user-initiated queries (searches) or they can be initiated at any time by social network server 106. Suggestion engine 110 can traverse AIG 112 visiting any nodes, including geography nodes 202 and any activity nodes (or, in some embodiments, only some types of nodes), using any arcs (or, in some embodiments, only some types of arcs), optionally ignoring the arc directions. As a result of the traversal, suggestion engine 110 obtains a suggestion set consisting of one or more nodes, sorts the suggestion set, and provides the sorted set of suggestions to social network server 106, which can then provide the sorted set of suggestions to user device 102.

In some embodiments, suggestion engine 110 starts traversing AIG 112 from a specific node. For example, when suggesting new users to a given user, suggestion engine 110 can begin traversing the graph from the user node 304 associated with that user. In other embodiments, for example, when a traversal originating at a single node returns an insufficient number of results, there could be more than one starting node. For example, when a user of the social network application issues a search using a text query, a generic index-based text search can be performed first. Next, the top results of that search can serve as the starting nodes for the traversal by suggestion engine 110.

In some embodiments, the way in which suggestion engine 110 traverses the graph, how suggestion engine 110 determines whether to add a node to a suggestion set, and how the suggestion set is subsequently sorted can each depend on the distances between nodes, e.g., the distance between a given node and the starting node. A "distance" between two nodes can be defined, for example, as the length of the shortest path between the two nodes, and can take into account any combination of the following: the number and/or the weights of nodes in the path, the number and/or weights of arcs in the paths, etc. Since geography nodes 202 can be included in the shortest path calculations, the suggestions provided by suggestion engine 110 are said to be location-based, or "location-aware". That is because activity nodes geographically closer to the starting node (i.e., separated by fewer geography nodes 202) are on average more likely to be included and highly ranked in a suggestion set than nodes that are geographically remote to the starting node.

In some embodiments, suggestion engine 110 can suggest one or more new friends to a user. For example, suggestion engine 110 can traverse the graph and find all friends of the user's friends that liked and/or commented on the user's posts. For example, suggestion engine 110 begins traversing AIG 112 from user node 202 associated with the user and finds all posts created by the user, for example, by following all arcs leading from user node 202 to post nodes 306 and tagged as POSTED. Suggestion engine 110 can then perform a breadth-first traversal to find other users (user nodes 202) that have commented or positively ranked the user's posts, as indicated by arcs COMMENTED, LIKED, RANKED, etc. Suggestion engine 110 can then run another traversal beginning at the user's node, this time visiting all user nodes 304 connected to the user's node with IS_FRIEND tags, and then visiting all nodes connected to these nodes with IS_FRIEND tags, thereby obtaining a list of all friends of the user's friends. Suggestion engine 110 can then obtain a set of users that are both in the latter list of friends of friends and in the list of users that liked or commented the user's posts. This intersection set can then be sorted by suggestion engine 110, for example, by the distance from the user to each user within the intersection set. To calculate the distance, suggestion engine can, in some embodiments, only look at paths that include geography nodes 202, ignoring any paths including action nodes. Thus, the distance in this case will correspond to the geographical (physical) distance between the two users. The sorted list can then be provided to social network server 106, which then can provide the list to user device 102.

In some embodiments, suggestion engine 110 can find posts that are related to a given post, and then suggest the related posts, for example, to users commenting, liking, or viewing the given post. For example, suggestion engine 110 can perform a breadth-first traversal on AIG 112, beginning at the given post, finding all users that liked it (by following all LIKED arcs leading to the post), finding all other posts that those users liked, and sorting all those posts based on their distance from the given post.

In some embodiments, in order to return the results faster, some optimization techniques can be employed by suggestion engine 110. For example, suggestion engine 110 could have thresholds defining the maximum level of depth it could go into the graph, or the maximum number of arcs it would follow from each node. Suggesting engine 110 can also employ a weight-based traversal, where it would only visit, for example, the N top-weighed nodes or follow M top-weighed arcs among all the possible nodes or arcs connected to a given node.

Promotional Users and Content

In some embodiments, local businesses or other entities can promote their content within AIG 112. For example, an entity could create an account in the social network application, and from that account it could create groups, create posts, comment on other groups, etc. In some embodiments, the entity could artificially increase its weight (the weight of the user node 304 associated with it) or the weights of its posts in exchange for payment or any other consideration. For example, an additional property type, "promotion level" can be added to such entity users, indicating, e.g., on a scale of 1 to N, the promotion level. The promotion level can then be taken into account in the weight ($W_u$) calculation. Thus, for example, the weight will be boosted while the promotion lasts, but will return to the popularity-based weight described above once the promotion expires.

In some embodiments, additional arc tags can be introduced and applied to the promotional users. For example, a group created by a promotional user can have an arc tagged as HAS_OFFER pointing, for example, to a post describing the offer. As another example, any member to a group created by a promotional user can be connected to the group via an arc tagged as VISITED_ADVERTISEMENT. As another example, users that viewed or clicked on a post created by a promotional user can be connected to that post via an arc tagged as CLICKED.

Finding ads related to a specific ad can be one of the queries related to promotional users and content. In some embodiments, to find related ads, suggestion engine 110 first finds starting nodes. The node associated with the specific can be a starting node. Alternatively, suggestion engine 110 can run a text query, based, for example, on the contents or the attributes of the specific ad, and use the top results returned for the query as starting nodes. Once one or more starting nodes are obtained, for each starting node, suggestion engine 110 can find its closest geography node 202 and then run a breadth-first search for other promoted nodes. The results can be then sorted, for example, by their distance to the starting node.

In some embodiments, individual posts can have their own promotion level. Thus, for example, a user can create several posts and indicate which posts should be promoted and at which promotion level. Suggestion engine 110 can then support a "nearby offers" query searching for promotional posts ("offers") located in the geographical vicinity of a certain location, user, group, or post. To achieve that, suggestion engine 110 can run a search similar to the related-posts search described above, but this time following only HAS_OFFER arcs.

Figure 5:
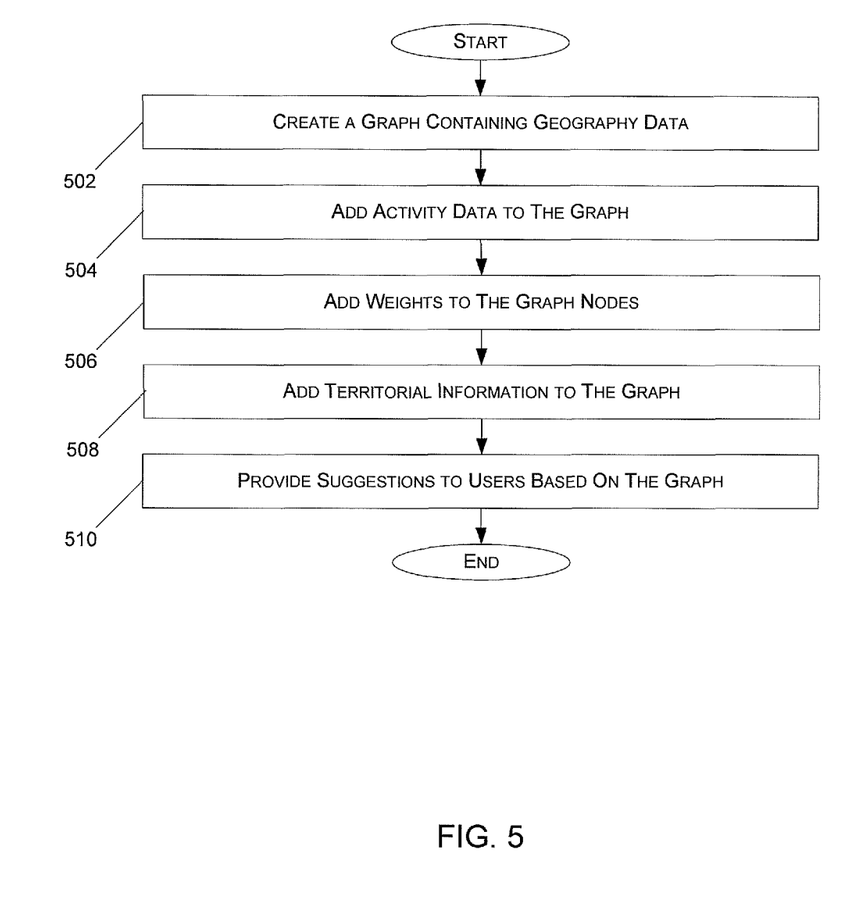
FIG. 5 is a flowchart illustrating an exemplary method of location-based content organization and content suggestions.

FIG. 5 is a flowchart illustrating an exemplary method of location-based content organization and content suggestions. The method can be performed by one or more devices (e.g, social network server 106 and/or graph engine 108 and/or suggestion engine). While the flowchart discloses the following steps in a particular order, it is appreciated that at least some of the steps can be moved, modified, combined, or deleted where appropriate.

The method creates (502) a graph (e.g., AIG 112) containing geography data (e.g., geography nodes 202) and adds (504) activity data (e.g., user nodes 304, post nodes 306, group nodes 308, etc) to the graph. The method can then add (506) weights to the nodes and/or the arcs of the graph (such as the exemplary weights addressed above). The method can then optionally add (508) territorial influence data to the graph. The method can then use the information contained in the graph to provide (510) content suggestions to users.

The methods disclosed herein may be implemented as a computer program product, i.e., a computer program tangibly embodied in an information carrier, e.g., in a machine readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a standalone program or as a module, component, subroutine, or other unit suitable for use in a computing environment. A computer program can be deployed to be executed on one computer or on multiple computers at one site or distributed across multiple sites and interconnected by a communication network.

A portion or all of the methods disclosed herein may also be implemented by an application specific integrated circuit (ASIC), a field-programmable gate array (FPGA), a complex programmable logic device (CPLD), a printed circuit board (PCB), a digital signal processor (DSP), a combination of programmable logic components and programmable interconnects, a single central processing unit (CPU) chip, a CPU chip combined on a motherboard, a general purpose computer, or any other combination of devices or modules capable of performing location-based content organization and content suggestions.

In the preceding specification, the disclosure has been described with reference to specific exemplary embodiments. It will, however, be evident that various modifications and changes may be made without departing from the broader spirit and scope of the disclosure as set forth in the claims that follow. The specification and drawings are accordingly to be regarded as illustrative rather than restrictive. Other embodiments may be apparent to those skilled in the art from consideration of the specification and practice of the invention disclosed herein.

The work that led to the development of the subject matter disclosed herein was co-financed by Hellenic Funds and by the European Regional Development Fund (ERDF) under the Hellenic National Strategic Reference Framework (ESPA) 2007-2013, according to Contract no. MICRO2-08.

What is claimed is:

1. A method of location-based data organization, the method comprising:
    obtaining a graph comprising a plurality of nodes, each node connected to at least one other node with an arc, wherein the plurality of nodes comprises:
        a plurality of geography nodes associated with geographical locations, wherein the plurality of geography nodes include at least one parent geography node representing a geographic location and a plurality of child geography nodes representing sub-geographic locations of a geographic location,
        a plurality of user nodes that are associated with users and that are connected via arcs to at least some of the plurality of geography nodes, wherein the arcs include an influence arc that indicates a level of territorial influence that the user node has in a geographic location associated with the geography node, and
        a plurality of activity nodes associated with the plurality of user nodes;
    dynamically assigning weights to the plurality of nodes; and
    finding, for a first activity node of the plurality of activity nodes or a user node of the plurality of user nodes, a suggested set of one or more activity nodes based on the assigned weights and a weight associated with the influence arc.

2. The method of claim 1, wherein each user node of the plurality of user nodes is associated with a user and is connected to a geography node that is associated with the geographical location of the user.

3. The method of claim 2, wherein finding the suggested set comprises traversing the graph and calculating shortest paths between either the first activity node or the user node and the plurality of activity nodes.

4. The method of claim 3, wherein calculating shortest paths is based at least in part on the weights assigned to the plurality of nodes.

5. The method of claim 3, wherein each arc is associated with an arc type, each node is associated with a node type, and traversing the graph comprises following arcs associated with one of a set of predefined arc types and visiting nodes associated with one of a set of predefined node types.

6. The method of claim 2, further comprising sorting the suggested set based on the lengths of the shortest paths.

7. A non-transitory computer readable medium storing a set of instructions that are executable by at least on processor of a computer to cause the computer to perform a method of location-based data organization, the method comprising:
    obtaining a graph comprising a plurality of nodes, each node connected to at least one other node with an arc, wherein the plurality of nodes comprises:
        a plurality of geography nodes associated with geographical locations, wherein the plurality of geography nodes includes at least one parent geography node representing a geographic location and a plurality of child geography nodes representing sub-geographic locations of a geographic location,
        a plurality of user nodes that are associated with users and that are connected via arcs to at least some of the plurality of geography nodes, wherein the arcs include an influence arc that indicates a level of territorial influence that the user node has in a geographic location associated with the geography node, and
        a plurality of activity nodes associated with the plurality of user nodes;
    dynamically assigning weights to the plurality of nodes; and
    finding, for a first activity node of the plurality of activity nodes or a user node of the plurality of user nodes, a suggested set of one or more activity nodes based on the assigned weights and a weight associated with the influence arc.

8. The non-transitory computer readable medium of claim 7, wherein each user node of the plurality of user nodes is associated with a user and is connected to a geography node that is associated with the geographical location of the user.

9. The non-transitory computer readable medium of claim 8, wherein finding the suggested set comprises traversing the graph and calculating shortest paths between either the first activity node or the user node and the plurality of activity nodes.

10. The non-transitory computer readable medium of claim 9, wherein calculating shortest paths is based at least in part on the weights assigned to the plurality of nodes.

11. The non-transitory computer readable medium of claim 9, wherein each arc is associated with an arc type, each node is associated with a node type, and traversing the graph comprises following arcs associated with one of a set of predefined arc types and visiting nodes associated with one of a set of predefined node types.

12. The non-transitory computer readable medium of claim 8, wherein the method further comprises sorting the suggested set based on the lengths of the shortest paths.

13. A social network server comprising:
    one or more processors; and
    a data storage configured to store a graph engine and a suggestion engine, wherein the graph engine is configured to:
        obtain a graph comprising a plurality of nodes, each node connected to at least one other node with an arc, wherein the plurality of nodes comprises:
            a plurality of geography nodes associated with geographical locations, wherein the plurality of geography nodes includes at least one parent geography node representing a geographic location and a plurality of child geography nodes representing sub-geographic locations of a geographic location,
            a plurality of user nodes that are associated with users and that are connected via arcs to at least some of the plurality of geography nodes, wherein the arcs include an influence arc that indicates a level of territorial influence that the user node has in a geographic location associated with the geography node, and a plurality of activity nodes associated with the plurality of user nodes;
dynamically assign weights to the plurality of nodes; and
provide the graph to the suggestion engine.

14. The social network server of claim 13, wherein the suggestion engine is configured to receive the graph from the graph engine, and to find, for a first activity node of the plurality of activity nodes or a user node of the plurality of user nodes, a suggested set of one or more activity nodes based on the assigned weights and a weight associated with the influence arc.

15. The social network server of claim 14, wherein each user node of the plurality of user nodes is associated with a user and is connected to a geography node that is associated with the geographical location of the user.

16. The social network server of claim 15, wherein finding the suggested set comprises traversing the graph and calculating shortest paths between either the first activity node or the user node and the plurality of activity nodes.

17. The social network server of claim 16, wherein calculating shortest paths is based at least in part on the weights assigned to the plurality of nodes.

18. The social network server of claim 16, wherein each arc is associated with an arc type, each node is associated with a node type, and traversing the graph comprises following arcs associated with one of a set of predefined arc types and visiting nodes associated with one of a set of predefined node types.

19. The social network server of claim 15, wherein the suggestion engine is further configured to sort the suggested set based on the lengths of the shortest paths.

* * * * *